United States Patent
Gesser et al.

(10) Patent No.: US 6,537,609 B1
(45) Date of Patent: *Mar. 25, 2003

(54) WATER-INSOLUBLE HYDROPHILIC MARINE COATING AND METHODS

(76) Inventors: Hyman D. Gesser, 218 Girton Boulevard, Winnipeg, MB (CA), R3P 0A7; Donald R. T. Lafreniere, 6413 Carmella Way, Sarasota, FL (US) 34243

(*) Notice: Subject to any disclaimer, the term of this patent is extended or adjusted under 35 U.S.C. 154(b) by 0 days.

This patent is subject to a terminal disclaimer.

(21) Appl. No.: 09/890,089

(22) PCT Filed: Oct. 25, 1999

(86) PCT No.: PCT/US99/24048
§ 371 (c)(1),
(2), (4) Date: Jul. 26, 2001

(87) PCT Pub. No.: WO00/44835
PCT Pub. Date: Aug. 3, 2000

Related U.S. Application Data

(63) Continuation-in-part of application No. 09/238,818, filed on Jan. 28, 1999, now Pat. No. 6,045,869.

(51) Int. Cl.[7] .............................. B05D 5/00; C09D 5/14; C09D 5/16
(52) U.S. Cl. ..................... 427/180; 427/385.5; 427/386; 106/15.05
(58) Field of Search .............................. 427/385.5, 386, 427/180; 106/15.05

(56) References Cited

U.S. PATENT DOCUMENTS

| | | |
|---|---|---|
| 3,575,123 A | 4/1971 | Shepard et al. |
| 4,100,309 A | 7/1978 | Micklus et al. |
| 4,119,094 A | 10/1978 | Micklus et al. |
| 4,373,009 A | 2/1983 | Winn |
| 4,642,267 A | 2/1987 | Creasy et al. |
| 5,488,076 A | 1/1996 | Supcoe et al. |
| 5,554,214 A | 9/1996 | Supcoe et al. |
| 5,700,559 A | 12/1997 | Sheu et al. |
| 5,919,689 A | 7/1999 | Selvig et al. |

FOREIGN PATENT DOCUMENTS

| | | |
|---|---|---|
| EP | 0 954 966 A1 | 11/1999 |
| GB | 1 303 179 | 1/1973 |
| JP | 61-181802 | * 8/1986 |
| JP | 61-181808 | * 8/1986 |

* cited by examiner

Primary Examiner—Erma Cameron
(74) Attorney, Agent, or Firm—Allen, Dyer, Doppelt, Milbrath & Gilchrist, P.A.

(57) ABSTRACT

A composition for coating an aqueous-solution-contacting surface for reducing kinematic friction, preventing corrosion and blistering, reducing water impact noise, and absorbing water shock includes a polymer including a polyhydroxystyrene of the novolak type. In alternate embodiments the composition also includes an antifouling agent, a gel coating material, or an epoxy. A method includes coating an aqueous-solution-contacting surface with the composition, preferably in a solution in an appropriate solvent, such as a low-molecular-weight oxygenated hydrocarbon such as alcohol or ketone. Application of the composition to a water-submersible or -contacting surface results in a hydrophilic surface having a considerably reduced contact angle, permitting increased speed and improving fuel efficiency.

19 Claims, 1 Drawing Sheet

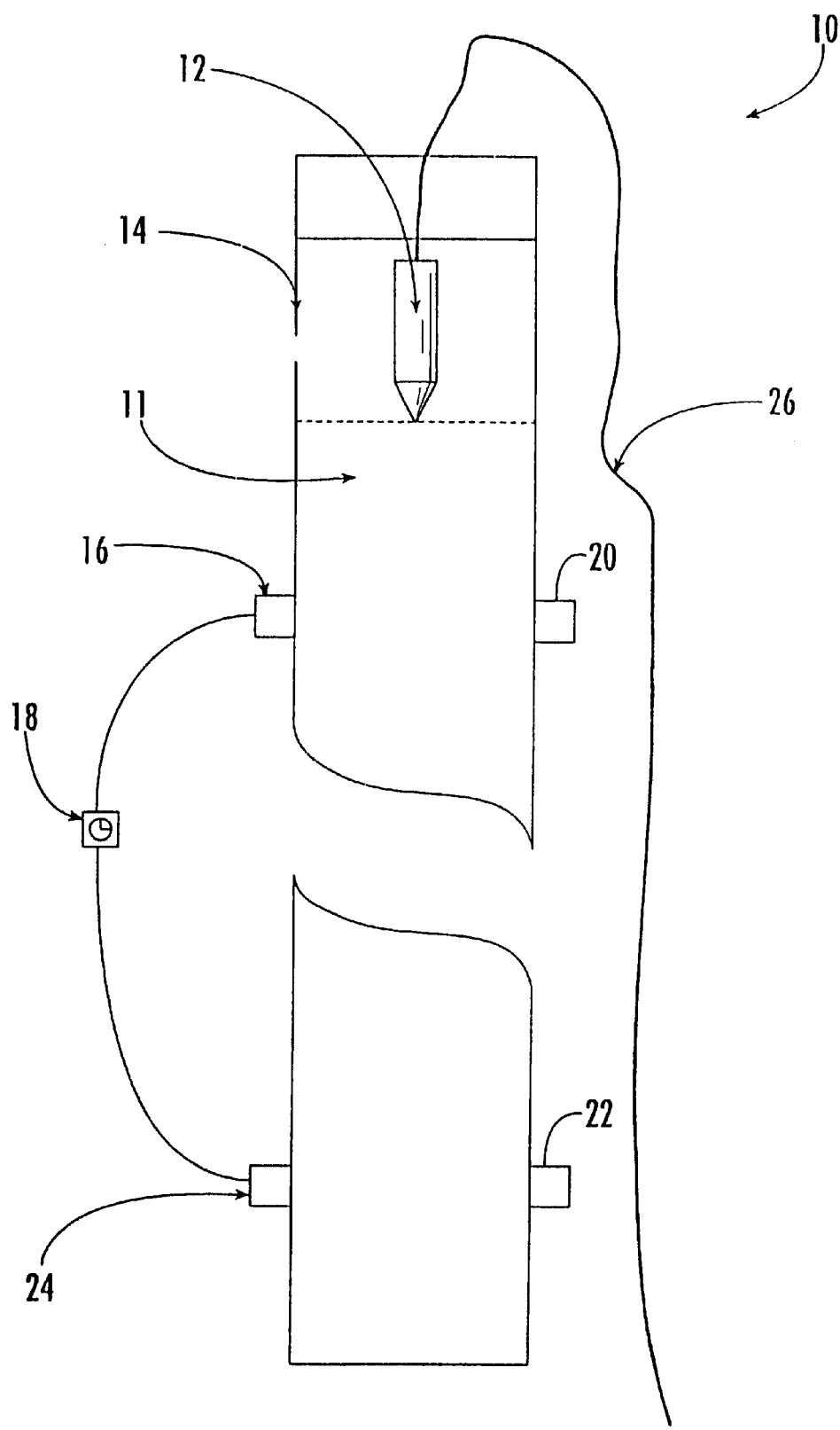
*FIGURE*

WATER-INSOLUBLE HYDROPHILIC MARINE COATING AND METHODS

CROSS-REFERENCE TO RELATED APPLICATIONS

The present application is a continuation-in-part of and claims priority to application Ser. No. 09/238,818, filed Jan. 28, 1999, now issued U.S. Pat. No. 6,045,869.

BACKGROUND OF THE INVENTION

1. Field of the Invention

The present invention relates to surface coatings, and, more particularly, to such coatings for use in a marine environment.

2. Description of Related Art

Marine coatings for application to moving watercraft and static underwater structures are known for use to preserve surfaces, improve their appearance, and reduce drag for moving watercraft. Such watercraft may comprise, but are not intended to be limited to, movable boats such as sailboats, yachts, inboard and outboard motor boats, rowboats, motor launches, canoes, kayaks, waterskis, surfboards, sailboards, waterbikes, ocean liners, tugboats, tankers, cargo ships, submarines, aircraft carriers, pontoons for sea planes, and destroyers. Underwater static structures may include, but are not intended to be limited to, wharves, piers, pilings, bridges, and other structures that may comprise wood, metal, plastic, fiberglass, glass, or concrete.

Some coatings known in the art include those described in U.S. Pat. Nos. 3,575,123; 4,642,267; 5,488,076; and 5,554,214. Antifouling compositions have also been known to be used against such organisms as barnacles, algae, slime, acorn shells (Balanidae), goose mussels (Lepodoids), tubeworms, sea moss, oysters, brozoans, and tunicates.

Coatings may be hydrophilic or hydrophobic, the latter incurring friction between the moving surface and the water and including Teflon-like, paraffin wax, and fluorocarbon/silicone materials. The former maintains an adhering layer of water, the kinematic friction occurring with the water through which the craft moves.

SUMMARY OF THE INVENTION

It is therefore an object of the present invention to provide a method of reducing kinematic friction between a marine watercraft and the water through which the watercraft moves.

It is an additional object to provide a coating for a marine watercraft for reducing kinematic friction.

It is a further object to provide such a coating that is hydrophilic.

It is another object to provide such a coating that also possesses antifouling properties.

It is yet an additional object to provide a new use for a novolak-type polymeric composition.

An additional object is to provide a composition and method for improving fuel efficiency in marine craft.

A further object is to provide a composition and method for coating a surface intended to contact water to improve kinematic friction.

Another object is to provide a composition and method for coating a surface to reduce noise associated with contact with water.

It is an additional object to provide a composition and method for coating a surface to absorb shock associated with water contact.

It is a further object to provide a composition and method for coating a surface to protect against corrosion and/or blistering.

These objects and others are attained by the present invention, a composition and method for coating water-contacting surfaces having the property of reducing kinematic friction. An embodiment of the composition comprises a solution including a polymer comprising a polyhydroxystyrene of the novolak type. Novolak is a type of structure achieved by phenol-formaldehyde resins when cross-linking of the straight-chain polymer occurs.

The polymer may be present in a concentration range of trace to the solubility limit, approximately 75% in alcohol. In a preferred embodiment the composition further comprises an antifouling agent.

In a first sub embodiment of the composition, the polyhydroxystyrene is blended in a low-molecular-weight oxygenated hydrocarbon solvent. In a second subembodiment, the polyhydroxystyrene is incorporated into a gel-type coating. In a third sub embodiment, the polyhydroxystyrene is incorporated into an epoxy, such as a one- or a two-part epoxy, for forming a permanent or semipermanent coating.

A first embodiment of the method of the present invention comprises applying the composition as described above to an outer surface of a marine watercraft or to any water-contacting surface to achieve a coating thereof. Preferably the composition is applied in a solution in an appropriate solvent, which may comprise a low-molecular-weight oxygenated hydrocarbon such as an alcohol or ketone. The coated surface is smooth and free of tackiness and thus is not fouled by common water debris such as sand and weeds. The coating is insoluble in water and resists abrasion, giving a functional lifetime that has been estimated to be a few years of continuous use.

A second embodiment comprises a method for increasing the kinematic efficiency of a marine watercraft, including applying the composition to a submersible surface of a marine watercraft.

A third embodiment comprises a method for making the composition, including blending the polyhydroxystyrene in a low-molecular-weight oxygenated hydrocarbon solvent, a gel coat, or an epoxy.

A fourth embodiment comprises a method for reducing noise of water impact, including applying the composition to a water-contacting surface such as a roof.

A fifth embodiment comprises a method for absorbing shock experienced by water-contacting surfaces, such as boat hulls, including applying the composition thereto.

A sixth embodiment comprises a method for protecting a water-contacting surface from corrosion or blistering, including applying the composition to the affected surface.

An application of the composition of the present invention to a water-submersible surface results in a hydrophilic surface having a considerably reduced contact angle. For example, when the composition is applied to a fiberglass/polyester surface with an initial contact angle of approximately 60° with water as determined by the tilting plate method (see N. K. Adam, *The Physics and Chemistry of surfaces,* Oxford Univ. Press, 1941), the contact Is angle is reduced to about 15°. Thus the use of the coating is beneficial on watercraft to increase the speed thereof and/or to improve the fuel utilization.

The features that characterize the invention, both as to organization and method of operation, together with further objects and advantages thereof, will be better understood from the following description used in conjunction with the accompanying drawing. It is to be expressly understood that the drawing is for the purpose of illustration and description and is not intended as a definition of the limits of the invention. These and other objects attained, and advantages offered, by the present invention will become more fully apparent as the description that now follows is read in conjunction with the accompanying drawing.

BRIEF DESCRIPTION OF THE DRAWINGS

THE FIGURE illustrates the laboratory apparatus used to test the effect of the coating of the present invention upon the speed of an object falling through water.

DETAILED DESCRIPTION OF THE PREFERRED EMBODIMENTS

A description of the preferred embodiments of the present invention will now be presented with reference to the FIGURE.

A first embodiment of the composition comprises a novolak-type polyhydroxystyrene dissolved in methanol as a 5–20 wt/vol % solution and an antifouling agent also present at 5–10 wt/vol %. A preferred embodiment of the polyhydroxystyrene comprises poly(p-hydroxystyrene) (Hoechst Celanese Corp., Dallas, Tex., US), either polymer grade (PHS-PG) or novolak grade (PHS-N).

An antifouling agent comprises at least one compound selected from the group consisting of copper powder, copper oxide, zinc oxide (Kadox 911), titanium oxide (Degussa P-25), tin oxide, Irgarol 1051 algicide (Ciba), and the antibiotic Compound X (Starbright), although other antifouling agents known in the art or to be conceived in the future may also be used. The best mode at present is believed to comprise zinc oxide, although this is not intended as a limitation. A pigment may also be included.

A copolymerization of the polyhydroxystyrene with at least one other hydroxylated polymer such as polyhydroxylethylmethacrylate, polymethacrylic acid, and polyhydroxymethylene or with another hydrophilic polymer such as polyallylamine, polyaminostyrene, polyacrylarnide, or polyacrylic acid allows a variation of the coating without reducing the solubility of the copolymer in the solvent, while also not increasing the solubility of the dry coated polymer in water.

A second embodiment of the composition comprises a polymer comprising polyhydroxystyrene incorporated into a gel coat as is known in the art for treating the surfaces of marine watercraft.

A third embodiment of the composition comprises a polymer comprising polyhydroxystyrene incorporated into an epoxy, including a one- or a two-part epoxy.

A fourth embodiment of the composition comprises a polymer comprising polyhydroxystyrene incorporated into isopropyl alcohol (IPA). The polymer may be dissolved in amounts ranging from trace to the solubility limit, here approximately 75%. Although not intended to be limiting, various ranges may be contemplated for different applications and different durabilities as follows: trace-5%, skis, scuba gear, jet skis, smaller boats; 5–10%, competition coatings; 10–30%, antifouling product, also adds in bonding of antifouling component(s); 30–40%, propeller coating; 40–75%, ships and applications requiring great durability; 75%-solubility limit, for applications requiring extreme wear or those subject to high abrasion, such as propeller coatings for ships or in high-speed applications.

A fifth embodiment of the composition includes a substance known as a "fugitive dye." This substance, which imparts a color, such as violet, to the composition, may be added to the polymer solution prior to applying the composition to a surface. The user can then check the surface during the coating process to ensure complete coverage, and the dye disappears over time.

Test Apparatus

A laboratory apparatus 10 used to test the effectiveness of the first embodiment of the coating of the present invention on a plastic bob 12 to affect the speed with which the bob 12 drops 1.3 m through sea water under the influence of gravity.

An exemplary bob 12 comprises aplastic hydrophobic pointed cylinder approximately 1.26 cm in diameter and from 7.62 to 25.40 cm in length.

The apparatus 10 includes a glass tube 14 1.52 m long and having an inner diameter of 3.5 cm filled with artificial seawater. The bob 12 was allowed to fall from an initial position 20 to a second position 22 1.3 m apart. A photoelectric detector 16 at the initial position 20 starts a digital electronic timer 18. A second photoelectric detector 24 at the second position 22 stops the timer 18. The time recorded, typically in the second range, depending upon the size and mass of the falling bob 12, represents the time taken for the bob 12 to fall from the initial position 20 to the second position 22.

The bob 12 also has a thread 26 attached to its top end, which enables the bob 12 to be raised after resetting the timer 18 to ready it for another test. The initial position 20 should be set carefully in order to achieve reproducible results with a low standard deviation from the mean when ten identical, or as close to identical as possible, tests are averaged.

Exemplary Test Results

Tests undertaken on the apparatus described above have shown that the falling time, which ranges from 1.5 to 6 sec depending upon the size and mass of the object, decreases by 100–300 msec when a coating of the present invention has been applied (Table 1). This represents an improvement in the speed of 2–8%. The maximum speed at which these tests were performed correspond to the equivalent of about 2.5 knots. This is far below the 9–20 knots of ocean tankers or the 20–30 knots of passenger ships and ocean cargo vessels. However, the results of Table 1B show that the degree of improvement of the coating increases as the speed of the moving object increases for a fixed surface-to-water contact area.

TABLE 1

Some typical results showing (a) the effect polyhydroxystyrene coatings on bobs of various materials by a determination of the time for the bob to fall (in milliseconds, ms), and (b) the effect of speed on the improvement due to the coatings for a fixed surface.

| (a) Material* | Antifouling Agent | Time (ms) Before Coating | Time (ms) After Coating | Percentage Improvement |
|---|---|---|---|---|
| 1. Polyethylene | ZnO | 3869.4 ± 44 | 3567.0 ± 30 | 7.9% |
| 2. Nylon | None | 4283 ± 79 | 4179 ± 41 | 2.4% |
| 3. Nylon | ZnO | 3098.2 ± 26 | 2988 ± 27 | 3.5% |
| 4. Polyvinyl-chloride | ZnO | 4561 ± 38 | 4404 ± 34 | 3.4% |
| 5. Polyvinyl-chloride | None | 1519.3 ± 13 | 1489.0 ± 10 | 2.0% |

| (b) | Mass of Bob Grams | Time (ms) Before Coating | Time (ms) After Coating | Percentage Improvement |
|---|---|---|---|---|
| 6. | 32.9 | 5047.6 ± 56 | 4959 ± 72 | 1.8% |
| 7. | 34.2 | 2011.7 ± 27 | 1947.6 ± 20 | 3.2% |
| 8. | 38.3 | 1711.3 ± 21 | 1664.4 ± 12 | 6.0 |

*1 & 3 were in distilled water with ZnO at 10% wt/vol %. All others were in sea water.
4 ZnO was at 15 wt/vol %.
6, 7, 8 the bob was a hollow polymethylmethacrylate pointed cylinder to which weights were added to make the bob fall faster.

It has been shown that an application of a 5–20% solution of polyhydroxystyrene in methanol changes a hydrophobic surface into a hydrophilic one. The contact angle of flat metal, plastic, and wood surfaces were determined by the tilting plate method before and after application of the coating. The results are given in Table 2, where the contact angles are the averages of the advancing and receding angles. These data show that the coating causes a significant decrease in the contact angle of water with the surface. Similar data were obtained when an antifouling agent such as listed previously is added.

TABLE 2

Contact angles of water on various surfaces before and after coating with a solution of Polyhydroxystyrene

| Surface | Contact Angle Before | Contact Angle after |
|---|---|---|
| Polyethylene | 56 | 16 |
| Stainless Steel | 42 | 20 |
|  | 61 | 18 |
| Aluminum | 70 | 15 |
| Fiberglass/polyester | 53 | 22 |
|  | 60 | 17 |
| Silicone rubber | 48 | 18 |
| Plexiglass | 60 | 12 |
|  | 63 | 14 |
| Polystyrene | 58 | 15 |
| Wood (oak) | 33 | 18 |

The coating was also applied to a test boat having an onboard computer to monitor the power, speed, and rpm. The characteristics of this exemplary test boat are given in Table 3, and the results of three tests under different conditions of speed and rpm for the uncoated and coated boat are given, respectively, in Tables 4A and 4B, with a summary given in Table 5. For fixed power, the coating effected an increase in speed of 8%, and the fuel savings was approximately 10% when the boat was fully in the water, i.e., prior to planing. The coated boat tended to plane at lower throttle speed and felt more slippery in the water than the uncoated boat.

TABLE 3

Boat Characteristics

| Gas Test Number | Test 1 |
|---|---|
| Boat Model | 26 Nova Spyder |
| Boat Number | WELP 340 E788 |
| Engine Manufacturer | Mercruiser Twin |
| Engine Model | 350 Magnum |
| Stern Drive Model | Alpha One |
| Gear Ratio (X:1) | 1.50:1 |
| Propshaft Hp | 500 |
| Stbd Idle Timing | 8 Degrees BTDC |
| Port Idle Timing | 8 Degrees BTDC |
| Stbd Adv Timing | 32 Degrees BTDC |
| Port Adv Timing | 32 Degrees BTDC |
| Rpm Range | 4400–4800 RPM |
| X" Dimension | 5¼ (1¼" Above) |
| Fuel Load | 60.0 Gallons  4900 Lbs Aft |
| Fuel Capacity | 120 Gallons  2800 Lbs Fwd |
| Boat Weight at Test | 9011 Pounds  7700 Lbs Ttl |
| Center of Gravity | 104.7 Inches  24.00 Ft. Dist. |
| Trim Tabs | Bennett 9" × 12" (Performance) |
| Exhaust System | Thru-transom 100 Pounds Gear |
| Driver | Willie Petrate 200 Pounds |
| Passengers | Don, Ken, Lee  640 Pounds |
| Location | Sarasota Bay |
| Water Conditions | Lite Chop |
| Wind Conditions | Northwest @ 10 MPH |
| Radar | Stalker |
| Fuel Flow Meter | Floscan 7000 |
| G" Meter | Vericom 2000r |
| Propeller Model | Quicksilver |
| Prop Material | Stainless Steel |
| Wellcraft PN | 1405=== |
| Manufacturer's PN | 48-163184 |
| Number of Blades | Three Rh |
| Diameter | 13¾" |
| Pitch | 21" |
| True Pitch | 22.0 Inches |

TABLE 3-continued

Boat Characteristics

| Hull Constant | 280,6633 | | | |
|---|---|---|---|---|
| Minimum Rpm to Maintain Plane | 2400 RPM | | | |
| Boat Position Angle at Rest | 4 Degrees | | | |
| Boat List Angle at Rest | 0 Degrees | | | |
| Bow Measurement (Inches) | N/A Inches | | | |
| Transom Measurement (Inches) | N/A Inches | | | |
| NMMA Boat Maneuverability Test | OK | | | |
| Backdown Test | Use Caution | | | |
| Sight Anti-ventilation Plate | Well Defined | | | |
| Total Fuel this Test | 12.0 Gallons | | | |
| Total Engine Time this Test | One Hour | | | |
| Recommended Cruising Rpm | 3500 RPM | | | |
| Acceleration Test | Test | | Seconds | Feet |
| Time to plane | 1 | | 4.10 | 60 |
| 0-20 Mph | 2 | | 4.17 | 61 |
| Drive Trim 100% dn | 3 | | 5.00 | 74 |
|  | Avg | | 4.42 | 65 |
| Recommended Propeller | Yes | | | |

TABLE 4A

BOAT TEST REPORT
MARINE ENGINE FUEL INJECTION
TEST NUMBER: Test 1

Normal Hull

| 1000 | RPM | | | | ZERO | LIST |
|---|---|---|---|---|---|---|
| slip % | 48.4% | 1 | 7.7 | mph | 83 | DB |
| mpg | 1.99 | 2 | 6.6 | mph | 4.25 | BPA |
| trim | 100% DN | 3 | 7.2 | mph | 3.6 | GPH |
| plates | None | avg | 7.2 | mph | 227 | RANGE |
| 1500 | RPM | | | | ZERO | LIST |
| slip % | 55.4% | 1 | 9.9 | mph | 85 | DB |
| mpg | 1.45 | 2 | 8.7 | mph | 6.5 | BPA |
| trim | 100% DN | 3 | 9.3 | mph | 6.4 | GPH |
| plates | None | avg | 9.3 | mph | 156 | RANGE |
| 2000 | RPM | | | | ZERO | LIST |
| slip % | 66.4% | 1 | 10.5 | mph | 86 | DB |
| mpg | 0.77 | 2 | 8.0 | mph | 7.75 | BPA |
| trim | 100% DN | 3 | 9.5 | mph | 12.2 | GPH |
| plates | None | avg | 9.3 | mph | 87 | RANGE |
| 2500 | RPM | | | | ZERO | LIST |
| slip % | 21.4% | 1 | 27.0 | mph | 87 | DB |
| mpg | 1.72 | 2 | 27.6 | mph | 3.75 | BPA |
| trim | 100% DN | 3 | 27.3 | mph | 15.9 | GPH |
| plates | None | avg | 27.3 | mph | 196 | RANGE |
| 3000 | RPM | | | | ZERO | LIST |
| slip % | 20.8% | 1 | 32.6 | mph | 88 | DB |
| mpg | 1.73 | 2 | 33.4 | mph | 3.75 | BPA |
| trim | 20% UP | 3 | 33.0 | mph | 19.1 | GPH |
| plates | None | avg | 33.0 | mph | 197 | RANGE |
| 3500 | Cruise RPM | | | | ZERO | LIST |
| slip % | 15.5% | 1 | 40.7 | mph | 90 | DB |
| mpg | 1.74 | 2 | 41.4 | mph | 3.50 | BPA |
| trim | 35% UP | 3 | 41.1 | mph | 23.6 | GPH |
| plates | None | avg | 41.1 | mph | 193 | RANGE |
| 3500 | RPM | | | | ZERO | LIST |
| slip % | 15.5% | 1 | 40.7 | mph | 90 | DB |
| mpg | 1.74 | 2 | 41.4 | mph | 3.50 | BPA |

TABLE 4A-continued

BOAT TEST REPORT
MARINE ENGINE FUEL INJECTION
TEST NUMBER: Test 1

|  |  |  |  |  |  |  |
|---|---|---|---|---|---|---|
|  |  |  |  |  | Normal Hull |  |
| trim | 35% UP | 3 | 41.1 | mph | 23.6 | GPH |
| plates | None | avg | 41.1 | mph | 193 | RANGE |
| 4000 | RPM |  |  |  | ZERO | LIST |
| slip % | 14.7% | 1 | 47.8 | mph | 91 | DB |
| mpg | 1.51 | 2 | 47.0 | mph | 3.25 | BPA |
| trim | 60% UP | 3 | 47.4 | mph | 31.4 | GPH |
| plates | None | avg | 47.4 | mph | 172 | RANGE |
| 4500 | RPM |  |  |  | ZERO | LIST |
| slip % | 14.5% | 1 | 54.0 | mph | 95 | DB |
| mpg | 1.35 | 2 | 53.4 | mph | 3.00 | BPA |
| trim | 70% UP | 3 | 53.0 | mph | 39.5 | GPH |
| plates | None | avg | 53.5 | mph | 154 | RANGE |
| 4760 | MAX RPM |  |  |  | ZERO | LIST |
| slip % | 14.3% | 1 | 56.0 | mph | 97 | DB |
| mpg | 1.22 | 2 | 57.2 | mph | 3.00 | BPA |
| trim | 80% UP | 3 | 56.8 | mph | 46.6 | GPH |
| plates | None | avg | 56.7 | mph | 139 | RANGE |

4750 RPM STBD ENGINE
4820 RPM PORT ENGINE
0 RPM SINGLE ENGINE

TABLE 4B

BOAT TEST REPORT
MARINE ENGINE FUEL INJECTION
TEST NUMBER: Test 2

|  |  |  |  |  |  |  |
|---|---|---|---|---|---|---|
|  |  |  |  |  | Hull Coated with PHS |  |
| 1000 | RPM |  |  |  | ZERO | LIST |
| slip % | 48.2% | 1 | 7.6 | mph | 83 | DB |
| mpg | 2.06 | 2 | 6.8 | mph | 4.25 | BPA |
| trim | 100% DN | 3 | 7.2 | mph | 3.5 | GPH |
| plates | None | avg | 7.2 | mph | 235 | RANGE |
| 1500 | RPM |  |  |  | ZERO | LIST |
| slip % | 52.5% | 1 | 9.7 | mph | 85 | DB |
| mpg | 1.52 | 2 | 10.1 | mph | 7.00 | BPA |
| trim | 100% DN | 3 | 9.9 | mph | 8.5 | GPH |
| plates | None | avg | 9.9 | mph | 174 | RANGE |
| 2000 | RPM |  |  |  | ZERO | LIST |
| slip % | 61.2% | 1 | 10.0 | mph | 86 | DB |
| mpg | .90 | 2 | 11.5 | mph | 8.25 | BPA |
| trim | 100% DN | 3 | 10.8 | mph | 12.0 | GPH |
| plates | None | avg | 10.8 | mph | 102 | RANGE |
| 2500 | RPM |  |  |  | ZERO | LIST |
| slip % | 15.1% | 1 | 29.2 | mph | 87 | DB |
| mpg | 1.84 | 2 | 29.7 | mph | 4.25 | BPA |
| trim | 100% DN | 3 | 29.5 | mph | 16.0 | GPH |
| plates | None | avg | 29.5 | mph | 210 | RANGE |

TABLE 4B-continued

BOAT TEST REPORT
MARINE ENGINE FUEL INJECTION
TEST NUMBER: Test 2

|  |  |  |  |  |  |  |
|---|---|---|---|---|---|---|
|  |  |  |  |  | Hull Coated with PHS |  |
| 3000 | RPM |  |  |  | ZERO | LIST |
| slip % | 14.1% | 1 | 36.0 | mph | 88 | DB |
| mpg | 1.85 | 2 | 36.4 | mph | 4.00 | BPA |
| trim | 20% UP | 3 | 35.0 | mph | 19.3 | GPH |
| plates | None | avg | 35.8 | mph | 211 | RANGE |
| 3500 | Cruise RPM |  |  |  | ZERO | LIST |
| slip % | 13.6% | 1 | 42.1 | mph | 90 | DB |
| mpg | 1.79 | 2 | 42.6 | mph | 3.50 | BPA |
| trim | 35% UP | 3 | 41.3 | mph | 23.5 | GPH |
| plates | None | avg | 42.0 | mph | 204 | RANGE |
| 3500 | RPM |  |  |  | ZERO | LIST |
| slip % | 13.6% | 1 | 42.1 | mph | 90 | DB |
| mpg | 1.79 | 2 | 42.6 | mph | 3.50 | BPA |
| trim | 35% UP | 3 | 41.3 | mph | 23.5 | GPH |
| plates | None | avg | 42.0 | mph | 204 | RANGE |
| 4000 | RPM |  |  |  | ZERO | LIST |
| slip % | 12.5% | 1 | 49.0 |  | 91 | DB |
| mpg | 1.54 | 2 | 48.7 | mph | 3.50 | BPA |
| trim | 60% UP | 3 | 48.1 | mph | 31.5 | GPH |
| plates | None | avg | 48.6 | mph | 176 | RANGE |
| 4500 | RPM |  |  |  | ZERO | LIST |
| slip % | 12.4% | 1 | 55.0 | mph | 95 | DB |
| mpg | 1.37 | 2 | 54.5 | mph | 3.50 | BPA |
| trim | 70% UP | 3 | 54.8 | mph | 40.1 | GPH |
| plates | None | avg | 54.8 | mph | 156 | RANGE |
| 4785 | MAX RPM |  |  |  | ZERO | LIST |
| slip % | 12.4% | 1 | 58.0 | mph | 97 | DB |
| mpg | 1.25 | 2 | 58.2 | mph | 3.25 | BPA |
| trim | 80% UP | 3 | 58.5 | mph | 46.5 | GPH |
| plates | None | avg | 58.2 | mph | 143 | RANGE |

*PHS = Polyhydroxysterene
4750 RPM STBD ENGINE
4820 RPM PORT ENGINE
0 RPM SINGLE ENGINE

TABLE 5

SO-BRIGHT INTERNATIONAL TEST RESULTS
Test One - Prior to Chemical Application
Test Two - After Chemical Application

| 20 Nova Spyder | TEST NR RPM | Test 1 MPH | Test 2 MPH | Changes IN MPH | Test 1 MPG | Test 2 MPG | Changes IN MPG | Test 1 RANGE | Test 2 RANGE | Changes IN RANGE |
|---|---|---|---|---|---|---|---|---|---|---|
| Mercruiser | 1000 | 7.2 | 7.2 | 0.0 | 2.0 | 2.1 | 0.07 | 227 | 235 | 7.6 |
| 350 Magnum | 1500 | 9.3 | 9.9 | 0.6 | 1.5 | 1.5 | 0.07 | 166 | 174 | 8.0 |
| Alpha One | 2000 | 9.3 | 10.8 | 1.4 | 0.8 | 0.9 | 0.13 | 87 | 102 | 15.1 |
| Sarasota Bay | 2500 | 27.3 | 29.5 | 2.2 | 1.7 | 1.8 | 0.12 | 196 | 210 | 14.2 |
| Quicksilver | 3000 | 33.0 | 35.8 | 2.8 | 1.7 | 1.9 | 0.13 | 197 | 211 | 14.5 |
| Stainless Steel | 3500 | 41.1 | 42.0 | 0.9 | 1.7 | 1.8 | 0.05 | 198 | 204 | 5.4 |
| Three Blades RH(2) | 4000 | 47.4 | 48.6 | 1.2 | 1.5 | 1.5 | 0.03 | 172 | 176 | 3.8 |
| 21" | 4500 | 53.5 | 54.8 | 1.3 | 1.4 | 1.4 | 0.03 | 154 | 158 | 3.8 |
| 4760 | 4785 | 56.7 | 58.2 | 1.6 | 1.2 | 1.3 | 0.04 | 121 | 124 | 3.6 |
| ACCELERATION (0–20 MPH): | | | | | | | | | | |
| SECONDS TO PLANE: | | 4.4 | 3.9 | | | | | | | |
| FEET TO PLANE: | | 65.0 | 57.0 | | | | | | | |

Notes:
The purpose of this test was to demonstrate the improvements we found (if any) in the performance of the boat described above. To do this we tested the boat prior to and immediately after a chemical application to the boats hull bottom. Test 1 shows results prior to and Test 2 shows results after.

The results clearly show that a boat coated with the composition of the present invention moves faster than an uncoated boat under substantially identical power consumption; similarly, for the same speed the coating reduces the rate of fuel consumption or increase the distance the boat will travel on a full tank of fuel. The difference varies with speed or power of the boat, and Table 5 shows that in the tests the maximum improvement of 17% at 2000 rpm corresponded to 10.8 miles/hour. At higher speeds the boat started to plane, resulting in less boat surface area in contact with water, and therefore a reduced beneficial effect of the coating is observed. For the case of ocean liners, cargo boats, or sailboats, which do not plane, it is expected that the beneficial effects of the coating of the present invention would continue to increase with an increase in power and speed since the surface-to-water contact area would not change under these changing conditions.

Further tests have been undertaken with different boats to study speed (two tests), fuel efficiency, and range, and with an aircraft to study water distance to takeoff. The test results are shown, respectively, in Tables 6–10.

TABLE 6

Improvement in Speed with Coated Hull[a]

| RPM | PRE AVG | POST AVG | DIFF. | % GAIN |
|---|---|---|---|---|
| 650 | 5.50 | 6.35 | 0.85 | 15.45 |
| 1000 | 7.30 | 8.50 | 1.20 | 16.44 |
| 1500 | 9.10 | 11.60 | 2.50 | 27.47 |
| 2000 | 14.90 | 15.95 | 1.05 | 7.05 |
| 2500 | 20.90 | 22.60 | 1.70 | 8.13 |
| 3000 | 26.50 | 27.80 | 1.30 | 4.91 |
| 3500 | 31.10 | 32.30 | 1.20 | 3.86 |
| 4000 | 34.00 | 36.50 | 2.50 | 7.35 |
| 4500 | 37.10 | 38.90 | 1.80 | 4.85 |
| 4775 | 39.30 | 40.50 | 1.20 | 3.05 |

[a]The boat tested was a Proline Model 3310, 33 ft in length, weight 14,700 lb., with two inboard Merc 385-hp engines. Wind speed was at 20–30 mph N in rough seas. Speed measured with a radar gun.

TABLE 7

Improvement in Speed with Coated Hull[a]

| RPM | PRE AVG | POST AVG | DIFF. | % GAIN |
|---|---|---|---|---|
| 1000 | 4.5 | 5.4 | 0.9 | 20 |
| 1500 | 6.3 | 6.9 | 0.6 | 9 |
| 2000 | 8.1 | 8 | [0.1] | [1] |
| 2500 | 9.2 | 9.7 | 0.5 | 5 |
| 3000 | 12.7 | 15.3 | 2.6 | 20 |
| 3500 | 20.7 | 21.8 | 1.1 | 5 |
| 4000 | 29.7 | 28.7 | [1.0] | [3] |
| 4500 | 33.8 | 34.7 | 0.9 | 3 |
| 5000 | 36.4 | 37.2 | 0.8 | 2 |

[a]The boat tested was a Parker Model 2520, 25 ft in length, weight 5724 lb., with one outboard Yamaha 225-hp engine. The measuring device was a Gannin 48 GPS.

TABLE 8

Improvement in Fuel Efficiency with Coated Hull[a]

| RPM | PRE AVG | POST AVG | DIFF. | % GAIN |
|---|---|---|---|---|
| 1000 | 1.9 | 2.3 | 0.4 | 21.1 |
| 1500 | 1.9 | 2.2 | 0.3 | 15.8 |
| 2000 | 1.7 | 1.8 | 0.1 | 5.9 |
| 2500 | 1.4 | 1.5 | 0.1 | 7.1 |
| 3000 | 1.6 | 2.0 | 0.4 | 25.0 |
| 3500 | 2.1 | 2.3 | 0.2 | 9.5 |
| 4000 | 2.4 | 2.5 | 0.1 | 4.2 |
| 4500 | 2.3 | 2.3 | 0 | 0 |
| 5000 | 1.6 | 1.9 | 0.3 | 18.8 |
| Max | 1.7 | 1.8 | 0.1 | 5.9 |
| Min plane rpm | 2200 | 2000 | −200 | −9.1 |

[a]The boat tested was a Parker Model 2520, 25 ft in length, weight 5724 lb., with one outboard Yamaha 225-hp engine. The measuring device was a Gannin 48 GPS.

TABLE 9

Improvement in Range with Coated Hull[a]

| RPM | PRE AVG | POST AVG | DIFF. | % GAIN |
|---|---|---|---|---|
| 1000 | 232.0 | 281.0 | 49.0 | 21.1 |
| 1500 | 229.0 | 258.0 | 29.0 | 12.7 |
| 2000 | 201.0 | 213.0 | 12.0 | 6.0 |
| 2500 | 166.0 | 178.0 | 12.0 | 7.2 |
| 3000 | 197.0 | 236.0 | 39.0 | 19.8 |
| 3500 | 257.0 | 271.0 | 14.0 | 5.4 |
| 4000 | 284.0 | 301.0 | 17.0 | 6.0 |
| 4500 | 273.0 | 275.0 | 2.0 | 0.7 |
| 5000 | 192.0 | 222.0 | 30.0 | 15.6 |
| Max | 199.0 | 210.0 | 11.0 | 5.5 |

[a]The boat tested was a Parker Model 2520, 25 ft in length, weight 5724 lb., with one outboard Yamaha 225-hp engine, with 75 gal fuel onboard. Speed measured with a Garmin 48 GPS.

TABLE 10

Improvement in Takeoff Distance (ft) with Coated Aircraft[a]

| RPM | PRE AVG | POST AVG | DIFF. | % REDN. IN TAKEOFF DISTANCE |
|---|---|---|---|---|
| 1000 | 1272.6 | 969.6 | −303.0 | 23.8 |
| 1500 | 1271.9 | 948.4 | −323.5 | 25.4 |
| 2000 | 1275.8 | 959.0 | −316.8 | 24.8 |
| AVG | 1273.4 | 959.0 | −314.4 | 24.7 |

[a]Coated fuselage and floats of an amphibious aircraft, Lake Buccaneer Model LA-4, at sea level, temperature range 74–85° F.; humidity range 88–90%.

Therefore, it can be seen that the composition and methods of the present invention represent a significant increase in speed, fuel efficiency, and range of boats, and an improvement (reduction) in takeoff distance required in an amphibious aircraft, thus conferring concomitant ecological, economic, and safety benefits.

Methods of Using the Compositions

Any of the compositions of the present invention may be used on virtually any water-contacting surface to reduce kinematic friction between the surface and the water. Such surfaces may include, but are not intended to be limited to, marine watercraft hulls, engine out drives, trim tabs, K-planes and other underwater hardware, propellers, shafts, personal submersible propulsion devices, amphibious aircraft, underwater dive equipment (wet suits, tanks, fins), pipes, and roofs.

The compositions may also be applied to such surfaces to reduce corrosion and prevent paint blistering.

The compositions may further be applied to such surfaces to provide shock-absorbing properties.

The compositions may additionally be applied to such surfaces to provide noise reduction, such as on a metal roof against rain noise.

It may be appreciated by one skilled in the art that additional embodiments may be contemplated, including compositions comprising polymers having characteristics imparting the desired properties and other antifouling agents.

In the foregoing description, certain terms have been used for brevity, clarity, and understanding, but no unnecessary limitations are to be implied therefrom beyond the requirements of the prior art, because such words are used for description purposes herein and are intended to be broadly construed. Moreover, the embodiments of the apparatus illustrated and described herein are by way of example, and the scope of the invention is not limited to the exact details of construction.

Having now described the invention, the construction, the operation and use of preferred embodiment thereof, and the advantageous new and useful results obtained thereby, the new and useful constructions, and reasonable mechanical equivalents thereof obvious to those skilled in the art, are set forth in the appended claims.

What is claimed is:

1. A method for coating a water-contacting surface of a marine watercraft comprising the step of applying a hydrophilic composition comprising a polyhydroxystyrene of the novolak type and an antifouling agent to the surface, wherein the antifouling agent comprises at least one compound selected from the group consisting of copper powder, copper oxide, zinc oxide, titanium oxide, tin oxide, an algicide, and an antibiotic agent.

2. A method for coating a water-contacting surface of a marine watercraft comprising the step of applying a hydrophilic composition comprising a polyhydroxystyrene of the novolak type to the surface, the polyhydroxystyrene present in a low-molecular-weight oxygenated hydrocarbon solvent in a solution in a concentration range of 1–75 wt/vol %.

3. A method for coating a water-contacting surface of a marine watercraft comprising the step of applying a hydrophilic composition comprising a polyhydroxystyrene of the novolak type and a fugitive dye to the surface.

4. A method for coating a water-contacting surface of a marine watercraft comprising the step of applying a hydrophilic composition comprising a polyhydroxystyrene of the novolak type to the surface, wherein the surface is selected from a group consisting of: a watercraft hull, a propeller, a shaft, an engine outdrive, a trim tab, a K-plane, and an outer surface of an amphibious aircraft.

5. A method for coating a water-contacting surface of a marine watercraft comprising the step of applying a hydrophilic composition comprising a polyhydroxystyrene of the novolak type and a gel to the surface.

6. A method for coating a water-contacting surface of a marine watercraft comprising the step of applying a hydrophilic composition comprising a polyhydroxystyrene of the novolak type and an epoxy to the surface.

7. A method for preventing corrosion in a water-contacting surface comprising the step of applying a coating to a submersible surface of the watercraft, the coating comprising a gel and a hydrophilic composition including a polyhydroxystyrene of the novolak type.

8. A composition of matter for use in coating aqueous-solution-contacting surfaces comprising a polyhydroxystyrene of the novolak type and an antifouling agent, the polyhydroxystyrene in a low-molecular-weight oxygenated hydrocarbon solvent, the polyhydroxystyrene present in a solution in a concentration range of 5–20 wt/vol %.

9. The composition recited in claim 8, wherein the solvent is selected from a group consisting of an alcohol and a ketone.

10. The composition recited in claim 8, wherein the solvent methanol.

11. A composition of matter for use in coating aqueous-solution-surfaces comprising a polyhydroxystyrene of the novolak type, a gel, and an agent.

12. A composition of matter for use in coating aqueous-solution-surfaces comprising a polyhydroxystyrene of the novolak type, an epoxy, and an antifouling agent.

13. A method of making a composition for coating an aqueous-solution-contacting surface comprising the step of forming a solution of a novolak-type polyhydroxystyrene in a solvent.

14. The method recited in claim 13, further comprising the step of adding an antifouling agent to the solution.

15. The method recited in claim 13, wherein the solution comprises a 5–20 wt/vol % solution of polyhydroxystyrene in an alcohol.

16. The method recited in claim 13, further comprising the step of adding 5–20 wt/vol % of an antifouling agent to the solution.

17. The method recited in claim 13, further comprising the step of copolymerizing the polyhydroxystyrene with a second hydrophilic polymer.

18. The method recited in claim 13, further comprising the step of blending the solution into a gel.

19. The method recited in claim 13, further comprising the step of blending the solution into an epoxy.

* * * * *